C. W. WADSWORTH.
Watch-Case Spring.
No. 160,368.  Patented March 2, 1875.
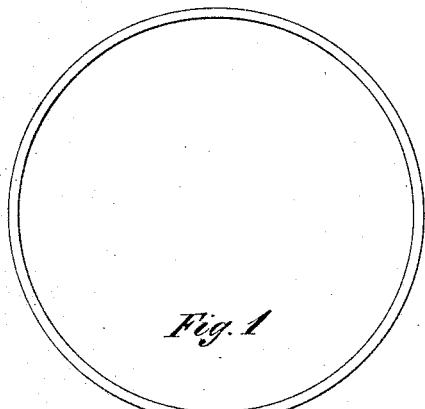
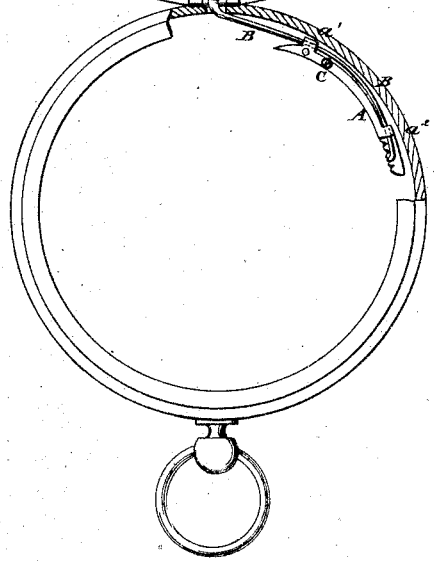
WITNESSES:
INVENTOR:
Constant W. Wadsworth
BY
ATTORNEYS.

UNITED STATES PATENT OFFICE.

CONSTANT W. WADSWORTH, OF PEEKSKILL, NEW YORK.

IMPROVEMENT IN WATCH-CASE SPRINGS.

Specification forming part of Letters Patent No. 160,368, dated March 2, 1875; application filed November 30, 1874.

*To all whom it may concern:*

Be it known that I, CONSTANT W. WADSWORTH, of Peekskill, in the county of Westchester and State of New York, have invented a new and useful Improvement in Watch-Case Spring, of which the following is a specification:

Figure 1 is a top view of my improved spring. Fig. 2 is a front view of the same.

Similar letters of reference indicate corresponding parts.

The invention will first be fully described, and then pointed out in the claim.

The spring is made in two parts, A B. The part A or holder is made rigid, and of such a size and curve as to fit into the cavity of the rim or edge of the watch-case, where it is secured in place by one or more screws, C, in the same way as the ordinary spring is secured in place. Upon the outer side of the forward end of the part A is formed a lug or projection, $a^1$, through which is formed a hole for the passage of the other part, B, of the spring, and which serves as a fulcrum for said part. Upon the outer side of the rear end of the part A is formed an offset or shoulder, $a^2$, through which is formed a hole for the passage of the rear end of the part A. The forward side of the rear or offset end of the part A is corrugated to receive the rear end of the part B, which is bent down at right angles, as shown in Fig. 2, to prevent the part A from slipping out of place when adjusted.

The part B is made of piano-wire or other elastic wire, and is not tempered so that it is not liable to break, and its forward end is bent upward to act upon the cover of the watch-case and throw it open when released from its catch. The holes through the lug $a^1$ and offset $a^2$ of the part A incline slightly downward toward the middle of said part to give a slight downward curve to the wire B between said lug and offset, which curve throws the forward end of said wire slightly upward to bring it into proper position.

With this construction the parts A B may be readily adjusted upon each other to bring the screw-holes of the part A into line with the screw-holes of the watch-case, so that it may not be necessary to mar said case by forming a number of screw-holes. With this construction, also, the spring will not be liable to break when in use.

Having thus described my invention, I claim as new and desire to secure by Letters Patent—

The combination, with watch-case, of the rigid holder A and untempered spring B, the former being end-corrugated and having lugs $a^1$ $a^2$ with downwardly-inclined apertures, arranged as and for the purpose specified.

CONSTANT W. WADSWORTH.

Witnesses:
C. G. HARSTRÖM,
W. P. WADSWORTH.